United States Patent
Verplancke et al.

(12) 
(10) Patent No.: US 10,563,618 B2
(45) Date of Patent: Feb. 18, 2020

(54) CAPACITIVE SYSTEM FOR CORRECTING THE POGO EFFECT WITH SEMI-CENTERED DISCHARGE TUBE CAPABLE OF BEING POSITIONED IN A BEND

(71) Applicant: ARIANEGROUP SAS, Paris (FR)

(72) Inventors: Cyril Paul Denis Verplancke, Asnieres-sur-Seine (FR); Mathieu Henry Raymond Triger, Vernon (FR); Jesus Angel Humanes Asensio, Vernon (FR); Jean-Luc Marcel Rene Pattyn, Gaillon (FR); Ivan Martinez Perez, Rouen (FR)

(73) Assignee: ARIANEGROUP SAS, Paris (FR)

( * ) Notice: Subject to any disclaimer, the term of this patent is extended or adjusted under 35 U.S.C. 154(b) by 345 days.

(21) Appl. No.: 15/547,384

(22) PCT Filed: Jan. 29, 2016

(86) PCT No.: PCT/FR2016/050187
§ 371 (c)(1),
(2) Date: Jul. 28, 2017

(87) PCT Pub. No.: WO2016/120571
PCT Pub. Date: Aug. 4, 2016

(65) Prior Publication Data
US 2018/0030928 A1 Feb. 1, 2018

(30) Foreign Application Priority Data
Jan. 30, 2015 (FR) .................................. 15 50747

(51) Int. Cl.
*F02K 9/60* (2006.01)
*F02K 9/50* (2006.01)
(Continued)

(52) U.S. Cl.
CPC ................ *F02K 9/60* (2013.01); *B64G 1/401* (2013.01); *F02K 9/50* (2013.01); *F02K 9/56* (2013.01);
(Continued)

(58) Field of Classification Search
CPC ........... B64G 1/401; B64G 1/402; F02K 9/50; F02K 9/56; F02K 9/566; F02K 9/60; F16L 55/05
See application file for complete search history.

(56) References Cited

U.S. PATENT DOCUMENTS 3,148,745 A * 9/1964 Jones ...................... F16L 55/02
 181/233
4,039,000 A 8/1977 Fletcher et al.
(Continued)

FOREIGN PATENT DOCUMENTS

FR 2 499 641 A1 8/1982
FR 2 975 440 A1 11/2012

OTHER PUBLICATIONS

International Search Report dated Apr. 21, 2016 in PCT/FR2016/050187 (with English translation).
(Continued)

*Primary Examiner* — Lorne E Meade
(74) *Attorney, Agent, or Firm* — Oblon, McClelland, Maier & Neustadt, L.L.P.

(57) ABSTRACT

A pogo effect corrector system for a feed system for feeding a rocket engine with liquid propellant, the corrector system comprising: a feed pipe part for feeding liquid propellant that is configured to be connected both upstream and downstream to a liquid propellant feed pipe of the feed system; and a hydraulic accumulator comprising a tank connected to the feed pipe part via at least one communication orifice; the corrector system being characterized in that: at least a
(Continued)

portion of the feed pipe part is at least partly surrounded by the inner volume of the tank; with each cross-section of said portion relative to its central axis being at least partly surrounded by the corresponding cross-section of the inner volume of the tank, in such a manner that the corresponding cross-section of the inner volume of the tank is off-center relative to said cross-section of said portion.

15 Claims, 6 Drawing Sheets

(51) Int. Cl.
    *F02K 9/56* (2006.01)
    *F16L 55/05* (2006.01)
    *B64G 1/40* (2006.01)

(52) U.S. Cl.
    CPC .............. *F02K 9/566* (2013.01); *F16L 55/05* (2013.01); *F05D 2250/312* (2013.01); *F05D 2260/96* (2013.01); *F05D 2270/44* (2013.01)

(56) References Cited

U.S. PATENT DOCUMENTS

| | | | | |
|---|---|---|---|---|
| 4,186,775 | A * | 2/1980 | Muroi | F16L 55/054 138/26 |
| 4,562,036 | A * | 12/1985 | Shin | F16L 55/05 138/30 |
| 4,979,441 | A * | 12/1990 | Welch | F16L 55/054 138/30 |
| 5,860,452 | A * | 1/1999 | Ellis | F16L 55/054 138/26 |
| 2014/0174054 | A1 | 6/2014 | Kernilis et al. | |

OTHER PUBLICATIONS

Luke A. Swanson, et al., "Design Analysis of the Ares I POGO Accumulator", 45$^{th}$ AIAA/ASME/SAE/ASEE Joint Propulsion Conference & Exhibit, XP055231760, Aug. 2, 2009, pp. 1-12.

\* cited by examiner

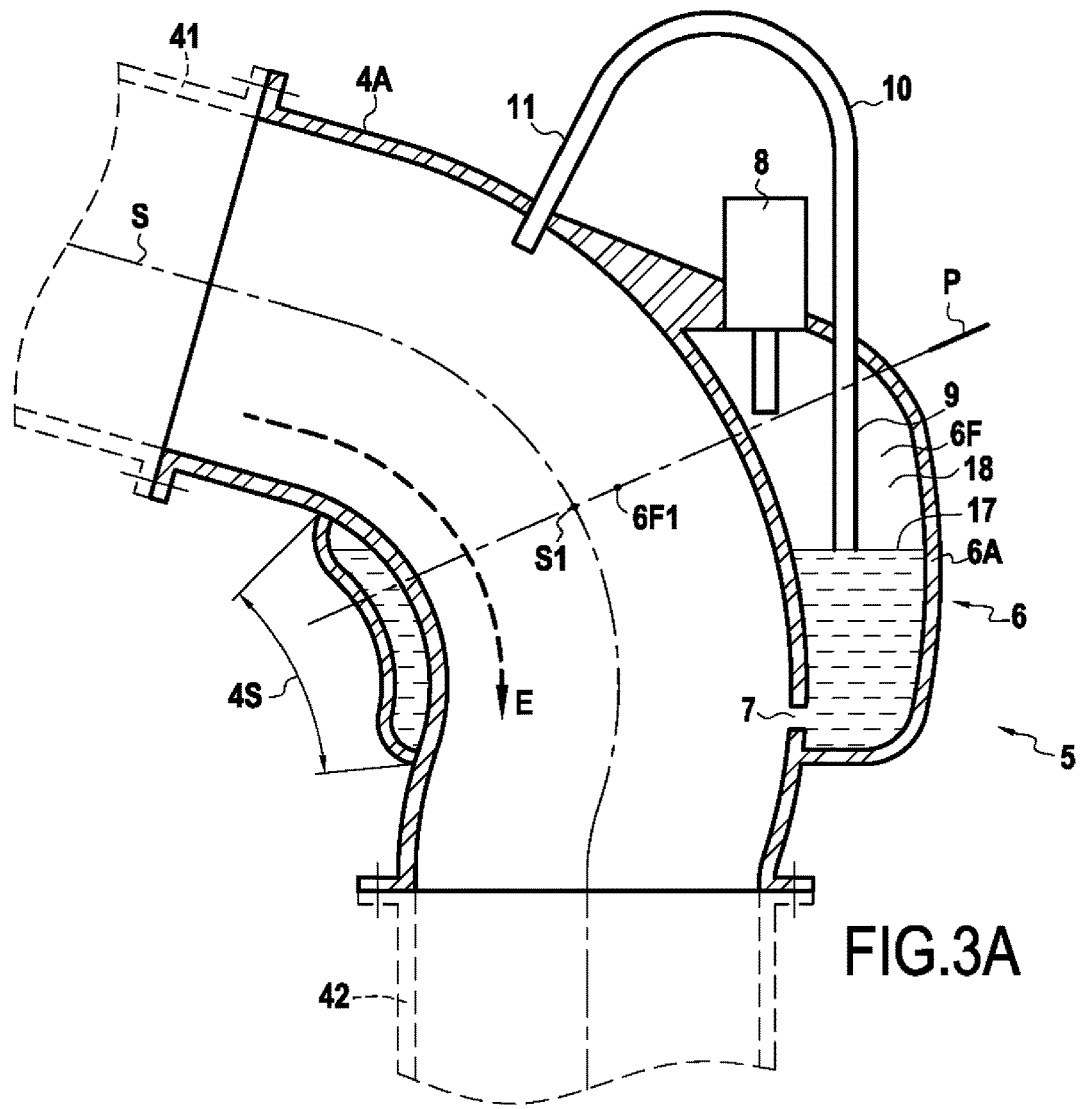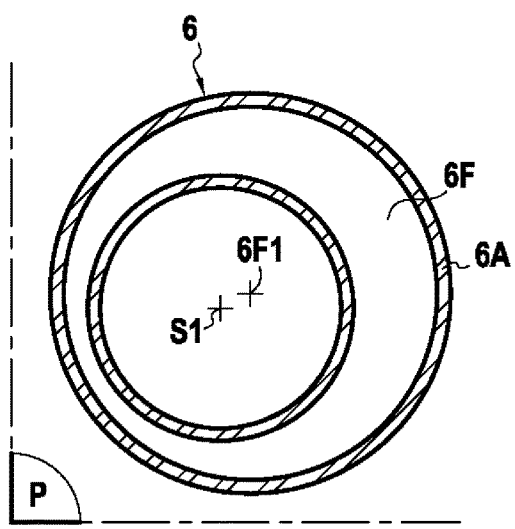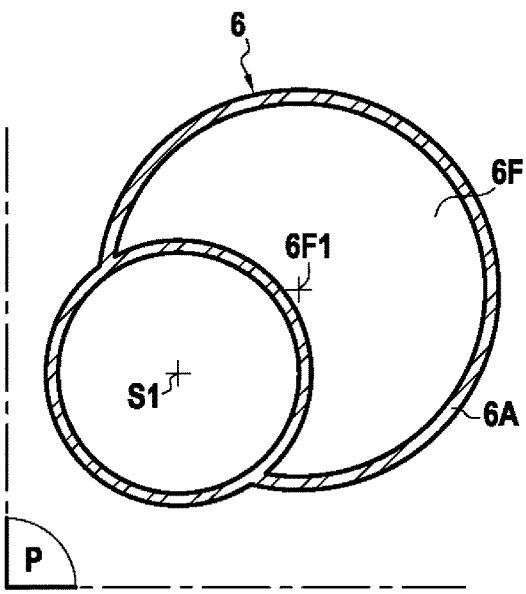
FIG.3A
FIG.3B
FIG.3C

CAPACITIVE SYSTEM FOR CORRECTING THE POGO EFFECT WITH SEMI-CENTERED DISCHARGE TUBE CAPABLE OF BEING POSITIONED IN A BEND The present invention relates to a system for feeding a rocket engine with liquid propellant and including a capacitive system for correcting the pogo effect.

BACKGROUND OF THE INVENTION

In the field of liquid propellant rockets, the name "pogo effect" has been given to the entering into resonance of a liquid propellant in a feed circuit of the rocket engine with mechanical oscillations of the rocket. Since the thrust of the rocket engine varies with the flow rate of propellant delivered by the feed circuit, such entry into resonance can give rise to oscillations that diverge rapidly, and thus to difficulties of guidance, and even to damage that can go as far as total loss of the payload or even of the vehicle. The term "pogo effect" does not come from an acronym but rather from pogo sticks, which are toys formed by a rod having a spring whose bounces reminded technicians of the violent longitudinal oscillations of rockets suffering from this effect. From the beginning of the development of liquid propellant rockets, it has therefore been very important to provide systems for correcting the pogo effect. The term "pogo effect corrector system" is used to designate any system suitable for completely eliminating pogo oscillations or for limiting them to an amplitude that is low enough to not cause guidance difficulties or damage to the vehicle.

Among pogo effect corrector systems, systems of the capacitive type are known in particular, e.g. as disclosed in French patent No. 2 975 440. In such a system, the tank of a hydraulic accumulator is arranged around the pipe of a line for feeding the rocket engine with liquid propellant (e.g. the line for feeding liquid oxygen (LOx)), and communicates with the feed pipe via communications orifices formed in its lower part. A constant flow of gas (e.g. helium (He)) is injected into the upper part of the tank so as to maintain a bubble of gas in the tank, and a dip tube connects the liquid-gas interface to the liquid propellant feed pipe.

In known capacitive corrector system architectures, the tank is centered, i.e. it is coaxial with the propellant feed pipe, and the communication orifices are distributed uniformly around the propellant feed pipe.

Those known architectures present drawbacks in terms of overall size. Indeed, in a rocket or any other space vehicle, it is desirable to limit the size of the liquid propellant feed system that includes the corrector system, in particular in the interest of performance at liftoff.

For that purpose, it has been proposed to integrate the capacitive corrector system in a bend in the liquid propellant feed pipe. Such integration is described, by way of example, in the article "Design analysis of the Ares I POGO Accumulator", Luke A. Swanson et al., $45^{th}$ AIAA/ASME/SAE/ASEE Joint Propulsion Conference & Exhibit, Aug. 2-5, 2009, and it is shown diagrammatically in FIG. 1.

The known capacitive corrector system 100 comprises a feed pipe part 101 and a hydraulic accumulator comprising a tank 102. The feed pipe part 101 is bent, and is configured to be connected upstream to an upstream liquid propellant feed pipe 103 and downstream to a downstream liquid propellant feed pipe 104. The flow direction E of the liquid propellant is shown by an arrow in FIG. 1. The tank 102 is centered around the feed pipe part 101. The assembly between the feed pipe part 101 and the feed pipe 103 is carried out by means of a flange and bolts.

In that architecture, since it is necessary to conserve a certain amount of space for passing the bolts, the flange cannot be arranged immediately upstream from the tank 102 (position 105A in FIG. 1). On the contrary, in order to leave the space needed for passing the bolts during assembly, it is essential to make provision in the feed pipe part 101 for a rectilinear segment 101A upstream from the tank 102, and to place its flange at the upstream end of this rectilinear segment (position 105B of the flange in FIG. 1). The presence of the rectilinear segment 101A partly cancels out the space-saving achieved by incorporating the capacitive corrector system 100 in a bend.

Furthermore, since the tank 102 remains centered around the feed pipe part 101, so that the bubble of gas and the communication orifices are distributed uniformly around the feed pipe as explained above, the capacitive corrector system 100 cannot be used in a small space (e.g. when the height available under the bend is small), or on a bend having a radius of curvature that is small.

Furthermore, in practice, such a capacitive corrector system is entirely welded to the feed pipe, which presents drawbacks, in particular the drawback of being neither modular, nor capable of being disassembled, and thus not making it easy to change the configuration of the communication orifices, should that be found to be necessary.

OBJECT AND SUMMARY OF THE INVENTION

The present invention seeks to propose a capacitive corrector system architecture that at least partly remedies these drawbacks.

To this end, the present invention proposes a pogo effect corrector system for a feed system for feeding a rocket engine with liquid propellant, comprising a feed pipe part for feeding liquid propellant that is configured to be connected at the upstream and the downstream thereof to a liquid propellant feed pipe of the feed system, and a hydraulic accumulator comprising a tank connected to the feed pipe part via at least one communication orifice, the corrector system being characterized in that at least a portion of the feed pipe part is at least partly surrounded by the inner volume of the tank, each cross-section of said portion relative to its central axis being at least partly surrounded by the corresponding cross-section of the inner volume of the tank, in such a manner that the corresponding cross-section of the inner volume of the tank is off-center relative to said cross-section of said portion.

Since the inner volume of the tank is off-center relative to the feed pipe part, it is possible to release sufficient space for assembling the feed pipe part with the feed pipe situated upstream and downstream from the corrector system. In particular, there is no need, for assembly purposes, to provide a rectilinear segment of the feed pipe. This makes it possible to reduce the overall size of the corrector system.

According to one possibility, the feed pipe part comprises a rectilinear portion extending to the downstream end of the feed pipe part.

According to one possibility, the at least one communication orifice is formed in the rectilinear portion of the feed pipe part.

According to one possibility, the tank includes a linear portion at least partly surrounding the rectilinear portion of the feed pipe part, and presenting a longitudinal axis passing via the center of each cross-section of the inner volume of the linear portion.

Since, in accordance with the invention, each corresponding cross-section of the tank is offset relative to the cross-section, the longitudinal axis of the linear portion of the tank is off-center relative to the axis of the rectilinear portion of the feed pipe. The linear portion of the tank presents the advantage of being simple to make.

According to one possibility, the longitudinal axis of the linear portion of the tank is parallel to the axis of the rectilinear portion of the feed pipe part.

According to one possibility, the feed pipe part is bent in a bend direction, and the longitudinal axis of the linear portion of the tank is offset relative to the axis of the rectilinear portion of the feed pipe in a direction opposite to the bend direction.

Thus, it is possible to provide a capacitive corrector system in a bend of the feed pipe, as in certain known architectures. Furthermore, since the tank is offset in a direction opposite to the bend direction, sufficient space is released to assemble the bent portion of the feed pipe part, in particular when this assembly is carried out by means of a flange and bolts.

According to one possibility, the at least one communication orifice is formed in the half-perimeter of the feed pipe part situated on the side thereof opposite to the bend direction.

In this way, the distance between the at least one communication orifice and the inner wall of the tank is kept sufficient to ensure satisfactory hydraulic behavior of the at least one communication orifice. This ensures that the corrector system operates correctly.

According to one possibility, the feed system comprises a bent part defining a pipe volume and a tank volume that are disjoint, a base part secured to the bent part, and a communication part forming a sleeve comprising the at least one communication orifice in its wall, and being secured to the base part and to the bent part in such a manner as to be inserted in a volume defined by the base part and the bent part, the feed pipe part being defined by the walls of the pipe volume and, in its rectilinear portion, by the communication part, and the tank being defined by the walls of the tank volume, of the communication part, and of the base part.

This configuration makes it possible to arrange the capacitive corrector system around the propellant feed line using only three parts, these parts all being capable of being made by machining. This avoids any need to assemble the system by using welding, and thus avoids the usual drawbacks associated with assembly by welding. Furthermore, the system is modular, and in particular it is easy to change the arrangement of at least one communication orifice, merely by replacing the communication part.

According to one possibility, the base part and the bent part are configured in such a manner as to be capable of being secured to each other by means of a circular flange.

This ensures that in order to perform assembly there is no need to have recourse to non-circular flanges, which are more complex and more expensive. Furthermore, when the propellant is liquid oxygen or more generally a cryogenic propellant, it is possible to use a known circular cryogenic gasket for providing sealing between the base part and the bent part, as opposed to a non-circular cryogenic gasket, which is considerably more expensive and requires specific development.

According to one possibility, the communication part is formed integrally with the base part or with the bent part.

This configuration is less expensive, and since the communication part is integral with one of the other two parts, assembly is also simplified.

According to one possibility, the base part, the bent part, and the communication part are made as a single unit by additive fabrication.

Thus, the outside wall of the tank may have an outside shape that is arbitrary and complex, and thus matched as well as possible to the surrounding space. This is desirable in any space vehicle such as a space launcher stage, where overall size needs to be reduced as much as possible.

According to one possibility, at least a part of the separator element of the bent part separating the pipe volume from the tank volume is of a thickness that is substantially constant.

In this way, the separator element follows the curvature of the feed pipe part, and the inner volume of the tank is increased. Since the inner volume of the tank is increased, the volume of gas held captive in the tank can vary over a wider range of values. The operating range of the pogo corrector system is thus increased.

According to one possibility, at least one compartment wall parallel to the axis of the linear portion of the tank is arranged in the tank, in such a manner as to subdivide the tank into a plurality of sub-volumes, each sub-volume being connected to the feed pipe part via at least one communication orifice.

The at least one compartment wall may extend radially from the wall of the feed pipe part or may extend radially from the wall of the tank.

During a stage of flight in which the system is subjected to lateral acceleration, in the absence of such compartment walls, the liquid-gas interface might reach at least one of the communication orifices, which would lead to undesirable malfunction of the capacitive corrector system. The presence of at least one compartment wall makes it possible to limit the appearance of such a situation by subdividing the tank into a plurality of sub-volumes of dimensions that are smaller than those of the tank as a whole.

According to one possibility, a fluid flow communication space is provided between the distal end of the at least one compartment wall and the facing wall of the tank or of the feed pipe part in such a manner as to put the sub-volumes of the tank into fluid flow communication. Additional communication orifices may likewise be provided in the at least one compartment wall so as to put the sub-volumes of the tank into fluid flow communication.

Since the various sub-volumes defined by the at least one wall are in fluid flow communication, the occurrence of malfunction of the corrector system is limited even when it is subjected to lateral acceleration.

BRIEF DESCRIPTION OF THE DRAWINGS

The invention will be well understood and its advantages will appear better upon reading the following detailed description of various embodiments, shown as non-limiting examples. The description refers to the accompanying drawings, in which:

FIG. 3A is a diagrammatic section view of the pogo effect corrector system in an embodiment according to the invention;

FIGS. 3B and 3C are sections on plane P of FIG. 3A showing two positioning variants for the tank relative to the feed pipe part;

DETAILED DESCRIPTION OF THE INVENTION

Figure 1:
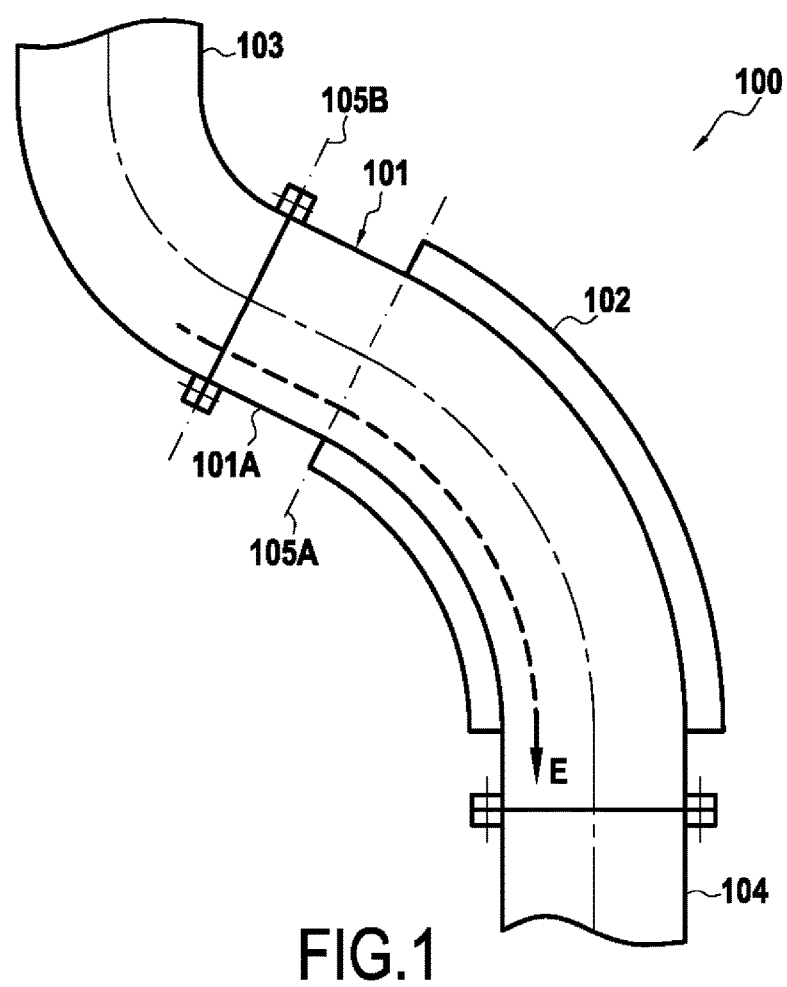
FIG. 1 is a diagrammatic view of a prior art pogo effect corrector system.
Figure 2:
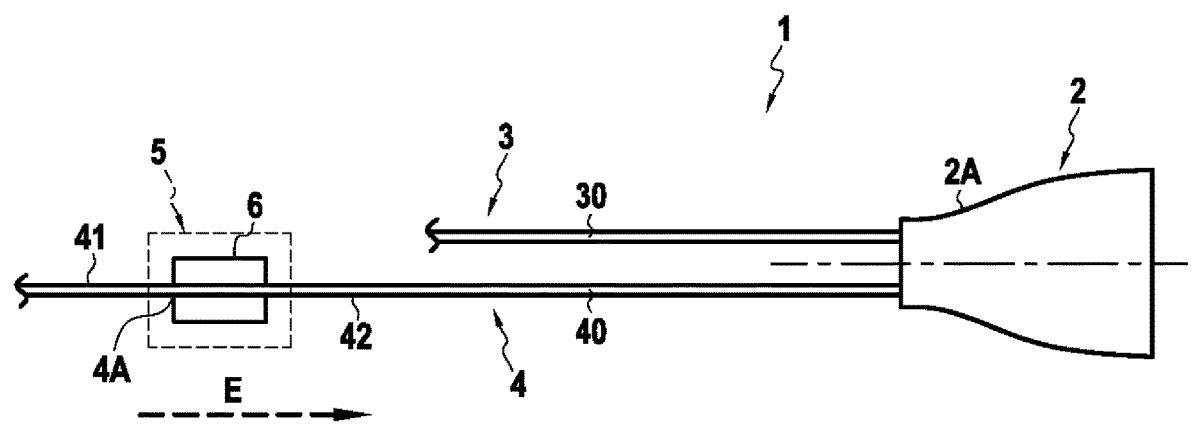
FIG. 2 is a diagrammatic view of a space vehicle including a pogo effect corrector system according to the invention.

FIG. 2 is a highly diagrammatic view of a space vehicle 1, such as a stage of a space launcher. The vehicle 1 includes a liquid propellant rocket engine 2. The rocket engine 2 comprises a propulsion chamber 2A incorporating a combustion chamber and a convergent-divergent nozzle, as is known.

The rocket engine 2 is fed with two liquid propellants by two feed systems 3 and 4, each having a respective propellant feed pipe 30 or 40. The first feed system 3 is only partly shown.

The second feed system 4 is provided with a capacitive pogo corrector system 5, referred to below as "PCS" for short.

Throughout the description below, the terms "upstream" and "downstream" are to be understood relative to the PCS 5, along the flow direction of the liquid propellant towards the rocket engine 2.

The PCS 5 comprises a hydraulic accumulator 6 and a feed pipe part 4A. The feed pipe part 4A is configured to be connected at an upstream thereof to an upstream part 41 of the feed pipe 40 and at a downstream thereof to a downstream part 42 of the feed pipe 40. The flow direction E of the liquid propellant is shown by an arrow in the figures. The feed pipe part 4A, the upstream part 41, and the downstream part 42 may be circular in section, for example.

As shown in greater detail in FIG. 3A, the hydraulic accumulator 6 comprises a tank 6A and a gas injector 8. The tank 6A is connected to the feed pipe part 4A via at least one communication orifice formed in the wall of the feed pipe part 4A, e.g. at a lower part of the tank 6A, and given overall reference 7. In the present description, the "upper" part of the tank 6A designates the part of the tank where the injected gas tends to accumulate due to its density being lower than the density of the liquid propellant flowing in the pipe, and due to the acceleration to which the PCS 5 is subjected while the rocket engine 2 is in operation. Conversely, the "lower" part of the tank designates the part of the tank where the liquid tends to accumulate due to its greater density, and due to the acceleration to which the PCS 5 is subjected while the rocket engine 2 is in operation.

The hydraulic accumulator 6 also has a dip tube 9. Pipework 10 connects the tank 6A, via the dip tube 9, to a rejection tube 11 leading into the feed pipe part 4A.

In a typical example, the liquid propellant flowing in the feed pipe 40 and the feed pipe part 4A is liquid oxygen (LOx), and the gas injected by the injector 8 is helium (He).

While the rocket engine 2 is in operation, the injector 8 injects a constant flow of gas into the tank 6A, thereby creating a gas volume 18 in the tank, and thus an interface between the gas and the liquid propellant (referred to below as the "liquid-gas interface" 17). The gas is then reinjected into the feed pipe part 4A via the dip tube 9, the pipework 10, and the rejection tube 11. Because of the presence of the gas volume 18 in the tank, it is possible to avoid the appearance of pogo oscillations, as is known, by modifying the natural frequencies of the feed pipe.

The present invention relates more particularly to the positioning of the tank 6A relative to the feed pipe part 4A when the latter is not rectilinear.

As shown in FIGS. 3A to 3C, at least a portion 4S of the feed pipe part 4A is at least partly surrounded by the inner volume 6F of the tank 6A.

Each cross-section of the portion 4S (i.e. a section of the portion 4S taken perpendicularly to its axis S) is at least partly surrounded by the inner volume 6F of the tank 6A, so that the corresponding cross-section of the inner volume 6F is off-center relative to said cross-section of the portion 4S.

The term "corresponding cross-section of the inner volume" 6F is used to mean the cross-section of the inner volume 6F taken in the same plane as the cross-section of the portion 4S. These two cross-sections are shown in greater detail in the section view of FIG. 3B. This cross-section view of an example is taken on a section plane P, the cross-section plane P being perpendicular to the axis S and intersecting the axis S at a point S1.

As can be seen on FIG. 3B, the corresponding cross-section of the inner volume 6F (i.e. the section of the inner volume 6F in the plane P) is off-center relative to the section of the portion 4S.

The term "off-center" is used to mean that the center 6F1 of the corresponding cross-section of the inner volume 6F does not coincide with the point S1, where the point S1 is the center of the cross-section of the portion 4S.

In this definition, the center 6F1 of the corresponding cross-section of the inner volume 6F is defined as follows:

if the corresponding cross-section is in the shape of a circle or of a circle that has had a region of arbitrary shape removed therefrom, then the center 6F1 is the center of the circle;

if the corresponding cross-section has the shape of an ellipse or an ellipse from which a region of arbitrary shape has been removed, then the center 6F1 is the center of the ellipse; and if the corresponding cross-section is of a shape that is neither a circle, nor a circle that has had a region of arbitrary shape removed therefrom, nor an ellipse, nor an ellipse that has a region of arbitrary shape removed therefrom, then the center 6F1 is the barycenter of the area defined by the walls of the tank 6A (and possibly of the portion 4S) that define the corresponding cross-section of the tank.

Another definition of "off-center" is given below. For each cross-section of the portion 4S, it is possible to define a diameter of this cross-section that subdivides the plane P into two half-planes such that each half-plane contains one half of the corresponding cross-section of the tank. The corresponding cross-section is off-center when the area of one of the halves of the corresponding cross-section is strictly greater than the other.

The fact that the inner volume 6F of the tank 6A is off-center as defined above serves to provide sufficient space for assembling the feed pipe part 4A. In particular, while assembling the feed pipe part 4A using a flange and bolts, the off-center position of the inner volume 6F makes it possible to leave sufficient space for passing the bolts. Thus, there is no need to add a rectilinear segment of feed pipe upstream from the tank 6A, contrary to prior art architectures.

The corresponding cross-section of the inner volume 6F may encompass the cross-section of the portion 4S either partly (section view of FIG. 3C) or else in full (section view of FIG. 3B). The advantages obtained for assembly purposes are the same in both cases.

In a particular embodiment of the invention, the feed pipe part 4A has a rectilinear portion 4R of axis A extending to the downstream end of the feed pipe part 4A, i.e. to the junction between the feed pipe part 4A and the downstream part 42 of the feed pipe 40. The non-rectilinear portion of the feed pipe part 4A is given reference 4Q.

The rectilinear portion 4R may or may not coincide with the above-described portion 4S. In other words, and as discussed above, the inner volume 6F of the tank may or may not surround the feed pipe part 4A solely over the rectilinear portion 4R. It should be observed that where the portion 4S and the rectilinear portion 4R coincide, the axes A and S coincide.

The at least one communication orifice 7 may be formed in the rectilinear portion 4R, for example.

The tank 6A may also have a linear part 6R (i.e. a part of inner volume that is a cylinder of arbitrary section and of longitudinal axis A'). It should be observed that the longitudinal axis A' passes through each of the centers 6F1 of each of the above-discussed corresponding cross-sections.

For example, the axes A and A' may be parallel.

The linear portion 6R may constitute all or part of the tank 6A, or only its lower part, depending on the environment outside the PCS 5.

Figure 4A:
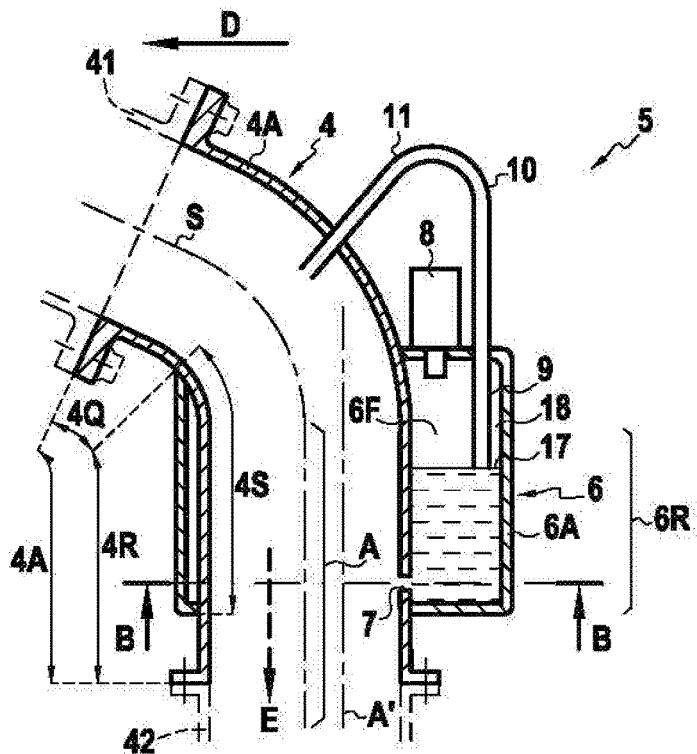
FIG. 4A is a diagrammatic section view of the pogo effect corrector system according to another embodiment of the invention.
Figure 4B:
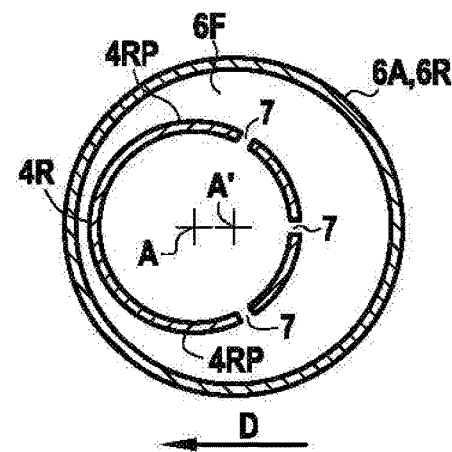
FIGS. 4B and 4C are sections along B-B of FIG. 4A showing two positioning variants for the tank relative to the feed pipe part.
Figure 4C:
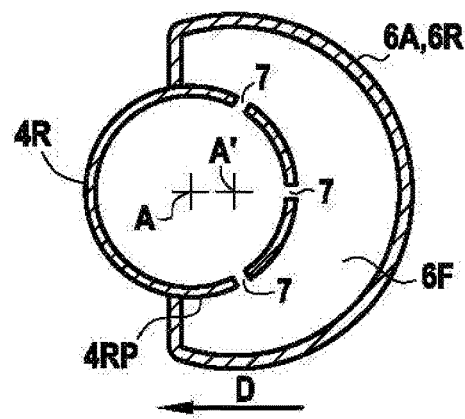

A configuration comprising a linear tank portion 6R and a rectilinear portion 4R is shown in FIGS. 4A to 4C.

In agreement with the general principle of the invention as set out above, the corresponding cross-section of the inner volume of the linear portion 6R in each cross-section perpendicular to the axis A surrounds the rectilinear portion 4R either partly (cross-section view of FIG. 4C) or in full (cross-section view of FIG. 4B). Furthermore, the corresponding cross-section of the inner volume of the linear portion 6R is off-center relative to the section of the rectilinear portion 4R, such that the two axes A and A' do not coincide.

As explained above, this off-center position makes it possible to make sufficient space available for assembling the PCS 5 with the upstream part 41 of the feed pipe 40, so there is no need to add an additional rectilinear segment of the feed pipe upstream from the tank 6A.

This provision is particularly useful when the feed pipe part 4A presents a bend.

More precisely, and as shown in FIG. 4A, the non-rectilinear portion 4Q is bent, i.e., going up along the feed pipe from downstream to upstream, the non-rectilinear portion 4Q departs from the axis A of the rectilinear portion 4R in a determined direction D referred to below as the "bend direction" D. In the present description below, it is also said, in a manner that is equivalent to this definition, that the feed pipe part 4A is bent in the bend direction D.

In this case, provision is made for the axis A' to be offset relative to the axis A in a direction that is opposite or substantially opposite to the bend direction D. In this way, when it is desired to assemble the bend portion 4Q of the feed pipe 4A to the upstream part 41 of the feed pipe 40 (in dashed lines in FIG. 4A), there exists sufficient space to perform the assembly. In particular, when assembly is performed using a flange and bolts (shown by interrupted lines in FIG. 4A), there exists sufficient space between the tank 6A and the upstream end of the bend portion 4Q to pass the bolts.

In order to conserve satisfactory hydraulic behavior for the at least one communication orifice 7, and thus satisfactory operation of the PCS 5, the at least one communication orifice 7 is formed in the half-perimeter 4RP of the rectilinear portion 4R situated on the side opposite to the bend direction D (see FIGS. 4B and 4C). Thus, the distance between the at least one communication orifice 7 and the inner wall of the tank is kept sufficient to enable satisfactory hydraulic behavior. Furthermore, when a plurality of communication orifices 7 are formed in the wall, the distances between the communication orifices 7 are kept sufficient to ensure that each of the orifices 7 has hydraulic behavior that is similar, e.g. in terms of head losses.

The tank 6A may be of arbitrary shape, so as to adapt the PCS system 5 to its surroundings within the vehicle 1, which may be occupied by other modules or structural elements.

In one particular case, the linear portion 6R is substantially elliptical in section, and the greatest distance between the inner wall of the tank and the outside wall of the feed pipe part 4A is situated beside the half-perimeter 4RP. Under such circumstances, depending on the relative positions of the feed pipe part 4A and of the tank 6A, the corresponding cross-section of the inner volume of the linear portion 6R is then in the form of a crescent or of an ellipse from which a substantially circular region has been removed.

Thus, the hydraulic behavior of the PCS 5 remains satisfactory and identical to that of prior art PCSs as discussed at the beginning of the present description. It should be observed that since the wavelength of the pogo oscillations is much greater than the diameter of the feed pipe part 4A, the pressure field applied via the feed pipe part 4A is uniform, such that from the point of view of the operation of the PCS 5, there is no disadvantage in providing the at least one communication orifice 7 only in the half-perimeter 4RP.

Figure 5:
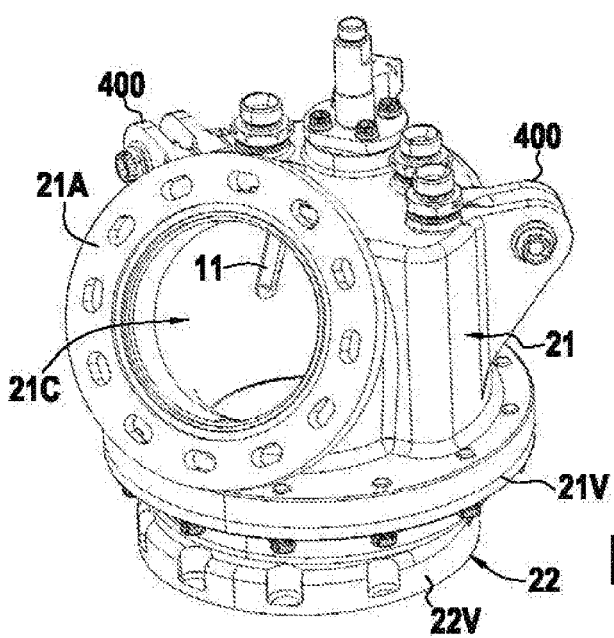
FIG. 5 is a perspective view seen from upstream of the feed pipe, showing an architecture of another embodiment of the invention.
Figure 6:
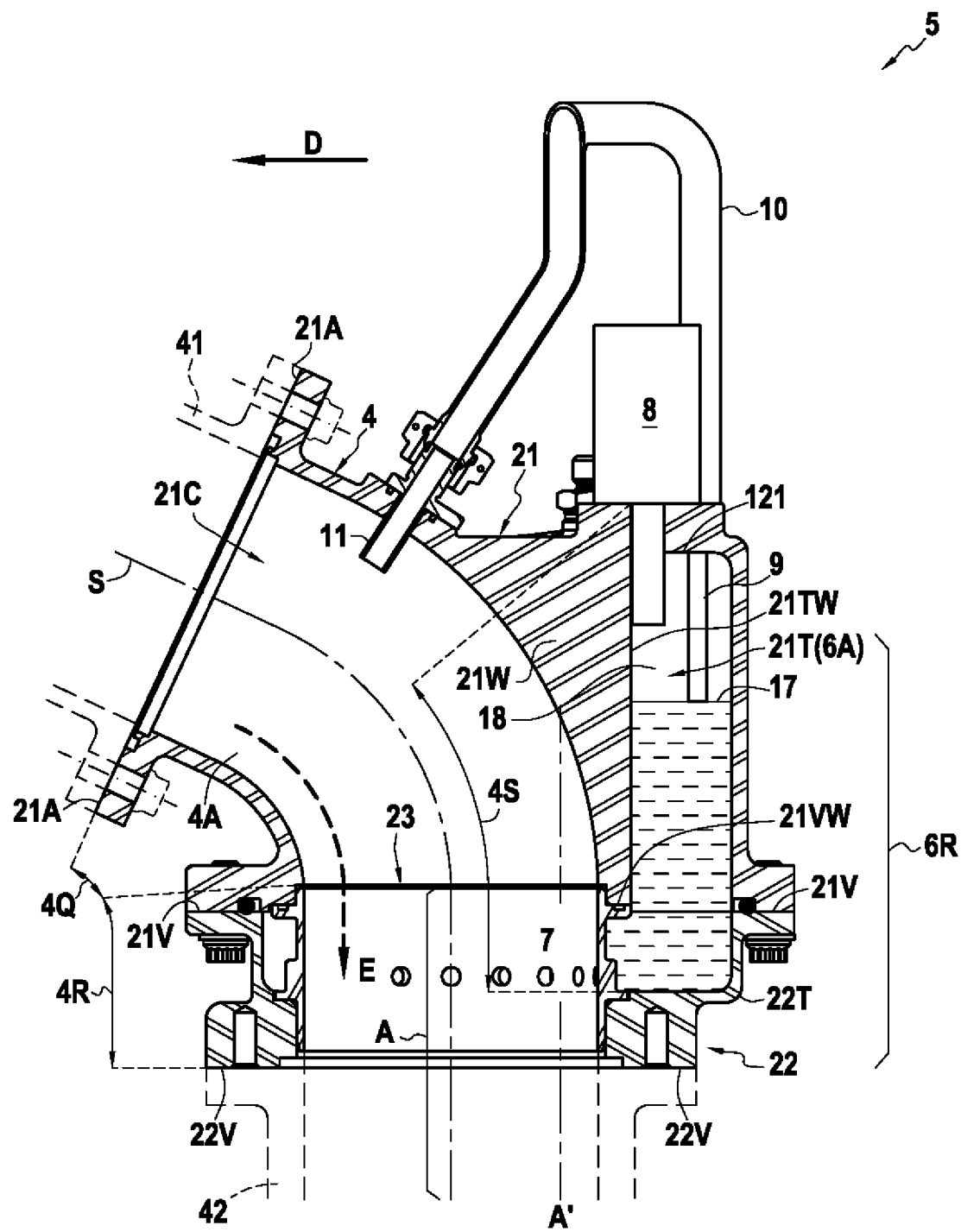
FIG. 6 is a section view of FIG. 5.

With reference to FIGS. 5 and 6, there follows a description of a structural example enabling the above-described architecture to be obtained with a limited number of parts to be assembled together. This structure comprises a bent part 21, a base part 22, and a communication part 23.

As can be seen more clearly in the section view of FIG. 6, the bent part 21 is shaped to define a pipe volume 21C and a tank volume 21T that are disjoint, i.e. that are separated from each other by an internal separator element 21W. The term "disjoint" is used to mean that fluid cannot pass from the pipe volume 21C to the tank volume 21T, or vice versa without leaving the envelope of the bent part 21.

The pipe volume 21C is shaped so as to constitute the bent portion 4Q of the feed pipe part 4A, as has been described above. Naturally, the rejection tube 11 opens out into the upstream part of the pipe volume 21C. The upstream end 21A of the pipe volume 21C is designed to be suitable for being secured to the upstream part 41 of the feed pipe 40, shown diagrammatically in interrupted lines in FIG. 6, e.g. using a flange and bolts.

The tank volume 21T is formed in such a way as to constitute the upper part of the tank 6A that contains the dip tube 9 and at least a part of the gas volume 18. When these terms are used relative to the tank, the terms "lower" and "upper" have the same meaning as given above.

As mentioned above, since the volume of the tank 21T is offset in a direction opposite to the bend direction D, sufficient space is preserved to be able to perform assembly, and in particular to pass the bolts (in interrupted lines in FIG. 6).

The base part 22 is formed so as to be capable of being secured to the downstream end 21V of the bent part 21. In FIG. 6, it can be seen that an uncentered part 22T of the base part 22 is assembled to the lower end of the part of the bent part 21 that constitutes the tank volume 21T so as to constitute the part of the tank 6A that is closest to the at least one communication orifice 7, and thus closing the lower end of the tank 6A.

It should be observed that the linear portion 6R of the tank may be formed exclusively by the volume defined by the uncentered part 22T, or by that volume plus a lower part of the volume of the tank 21T.

Still further downstream from the downstream end 21V, the base part 22 presents a downstream end 22V designed to be suitable for being secured to the downstream part 42 of the feed pipe 40, shown diagrammatically with interrupted lines in FIG. 6.

Preferably, the securing between the base part 22 and the bent part 21 takes place by means of a circular flange. Thus, this avoids any need to have recourse to non-circular flanges, which are more complex and more expensive, to perform the assembly. Furthermore, when the propellant is liquid oxygen, or more generally a cryogenic propellant, it is possible to use a conventional circular cryogenic gasket for providing sealing between the base part and the bent part, instead of using a non-circular cryogenic gasket, which is considerably more expensive, requires specific development, and may be less reliable.

Nevertheless, this securing could also be provided by welding. In this case, it is also preferable for the interface between the parts 21 and 22 to be circular, since in this case, assembling the parts together is simplified and it is easy to inspect the weld between the parts 21 and 22 over its entire periphery.

A communication part 23 is further provided in such a manner as to enable it to be inserted in the inner volume defined by the base part 22 and the bent part 22 when they are in the assembled position. The communication part 23 in general is in the form of a sleeve and it is inserted in this inner volume in such a manner as to extend the feed pipe from the downstream end 21V of the bent part 21 to the downstream end 22V of the bent part 22. For this purpose, it should be observed that the communication part 23 is not only secured to the downstream end 21V, but also to the downstream end 21VW of the separator element 21W, as can be better seen on FIG. 6.

By way of example, the communication part 23 may form all of the above-mentioned rectilinear portion 4R of the feed pipe 4A. It is also possible to make provision for a downstream part of the pipe volume 21C likewise to be rectilinear, so as to extend the rectilinear portion 4R upstream.

According to one possibility, the pipe volume 21C and the communication part 23 have a circular cross-section having the same diameter. This enables the communication part 23 and the bent part 21 to be secured together using a circular flange. Nevertheless, it is also possible to provide other cross-sections, so long as sealing is ensured.

In this structure, the least one communication orifice 7 is formed in the wall of the communication part 23. It is then possible to arrange the at least one communication orifice 7 in the half-perimeter of the communication part 23 that is situated on its side opposite from the bend direction D, as has been discussed above, and with the same advantages.

It should also be observed that, with this structure, it is easy to modify the arrangement of the at least one communication orifice 7, merely by replacing the communication part 23 with a modified version, should it be desired to modify the hydraulic characteristics of the PCS 5. This improves the modular nature of the PCS 5.

In a variant, provision may be made for the communication part 23 to be made integrally with one or the other of the parts 21 or 22, such that the two parts thus associated are made as a single. This can reduce the total cost of the structure and simplify assembly.

The at least one communication orifice 7 may be made by electroerosion of the communication part 23.

It should be observed that each of these three parts as described above may be made by machining, without having recourse to welding.

In the variant shown in FIG. 6, the surface beside the tank 21TW of the separator element 21W is substantially parallel to the axis A', such that the thickness of the separator element 21W increases on going upstream.

Figure 7:
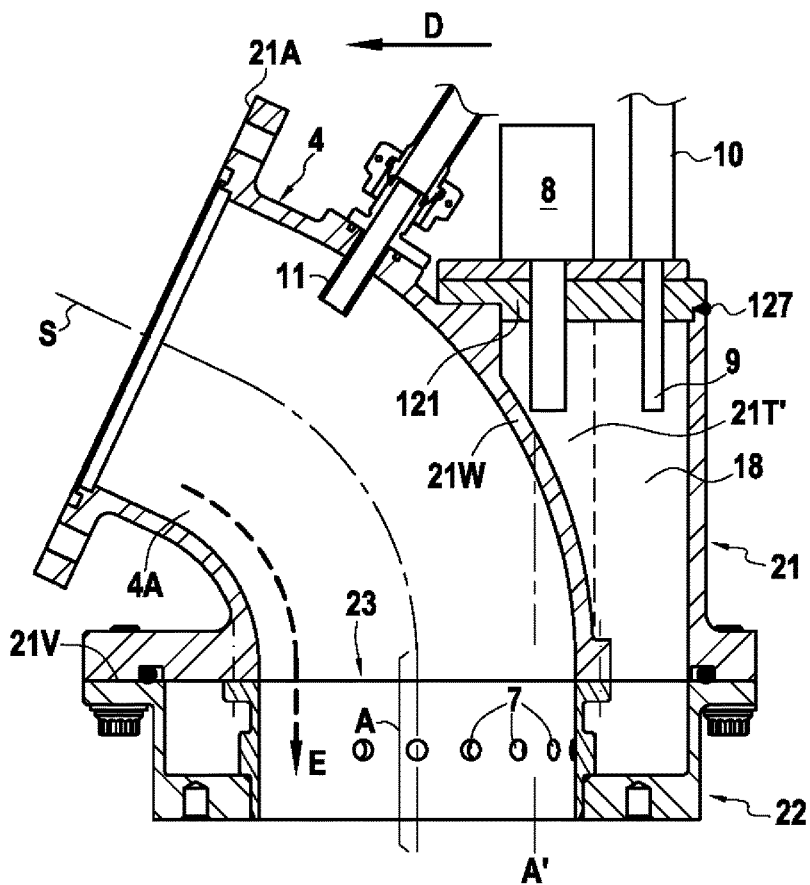
FIG. 7 is a detail view of FIG. 6 according to a variant of the invention.

In another example, provision is made for at least a part of the separator element 21W to be of substantially constant thickness, such that the surface beside the tank 21TW follows the curvature of the feed pipe. As shown in FIG. 7, this releases additional space 21T' in the part of the tank volume 21T that contains the gas volume 18. This makes it possible to enlarge the operating range of the PCS 5, which is defined by the range of gas volumes that can be contained in the tank, without increasing the overall size of the PCS 5.

In order to achieve this increase in volume, provision may be made for the upper wall 121 of the tank volume 21 to be constituted by a cover that is welded to the outside wall (i.e. the wall furthest from the bend direction D) of the tank volume 21T. The position of the weld 127 is shown in FIG. 7.

In order to facilitate machining the parts 21 and 22, one may elect to give the outside wall of the tank 6A a shape that is generally circular or elliptical.

As an alternative to the modes of manufacturing by machining (possibly associated with welding) which have just been described, it is also possible to make the parts 21, 22, and 23 either individually or as a single unit by additive fabrication, using known methods, e.g. selective laser melting (SLM), or by methods derived therefrom.

With such fabrication, it is easy to give the outside wall of the tank any arbitrary shape that would be extremely difficult if not impossible to obtain by machining. Such a complex shape is advantageous for adapting the PCS to its surroundings within the vehicle 1, which may be occupied by other modules or structural elements.

Figure 8:
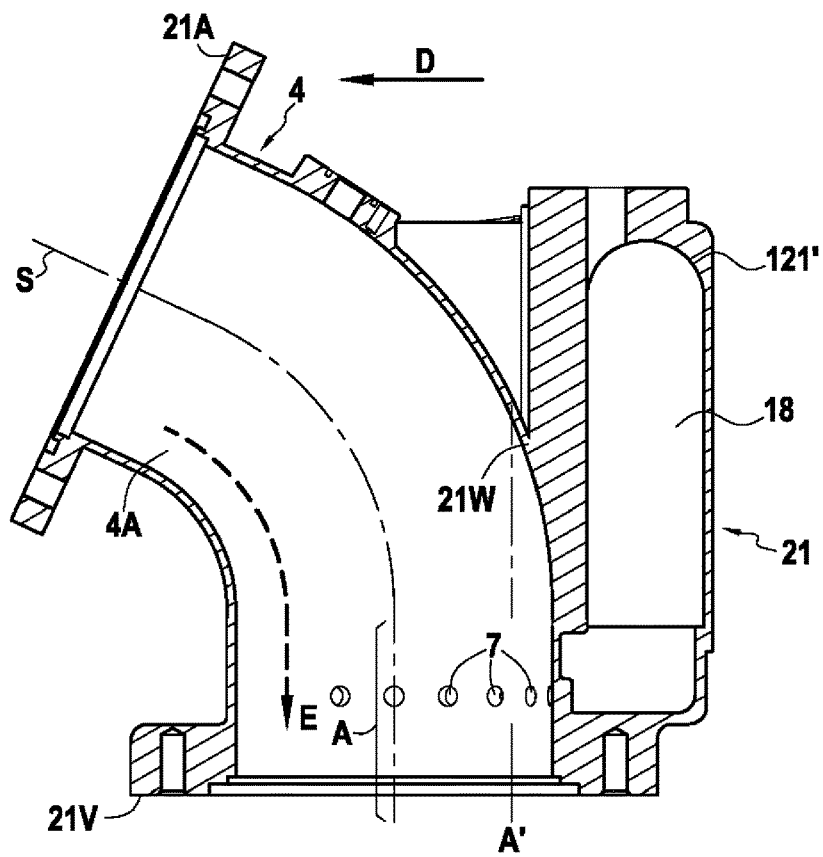
FIG. 8 shows another detail view of FIG. 6 according to another variant of the invention.

In order to enable the tank volume 21T to be made by additive fabrication, its upper part 121' is made as a vault, as shown in the detail view of FIG. 8. This somewhat, but not with much significance, reduces the inner volume of the tank.

With reference to FIGS. 9A to 11, there follows a description of a solution for limiting or preventing malfunctions of the PCS appearing as a result of uncovering inner the PCS when it is subjected to lateral acceleration.

Indeed, as is well known, when any container containing a liquid 16 and a gas 18 is subjected to a lateral acceleration G, the liquid tends to accumulate on one side of the container. Consequently, the liquid-gas interface 17 tends to move so as to acquire an extra height H (as shown diagrammatically in FIG. 9A), which is a function of the acceleration G and of the dimensions of the inner volume of the container.

For a PCS installed in a launcher stage, such lateral acceleration may occur during several stages of flight, and in particular when the launcher tilts after its initial liftoff in a vertical direction. If during such a lateral acceleration stage the gas-liquid interface 17 reaches the at least one communication orifice 7, at least locally (a phenomenon referred to as "uncovering"), fluid communication between the feed pipe part 4A and the tank 6A is disturbed, and a malfunction of the PCS 5 occurs. In order to prevent such a malfunction, it is therefore essential to preserve some minimum depth of liquid 6 in the tank, in other words to prevent the gas-liquid interface 17 from reaching the at least one communication orifice 7, even locally.

The inventors have recognized that for a given lateral acceleration, the risk of uncovering in the PCS is reduced with reduced inner dimensions for the tank.

More precisely, when the tank is considered as a whole, the uncovering phenomenon is more likely to occur in the region of the tank that is furthest from the region where the liquid tends to accumulate because of the lateral acceleration.

Figure 10A:
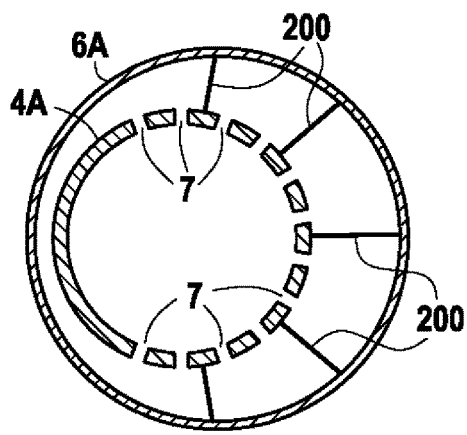
FIGS. 10A to 10C are sections along B-B of FIG. 4A showing various possible configurations for the compartment walls.
Figure 10B:
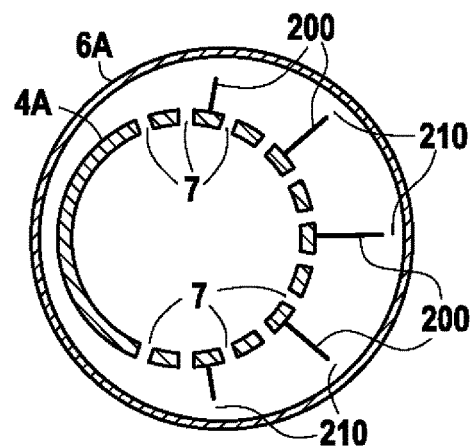
Figure 10C:
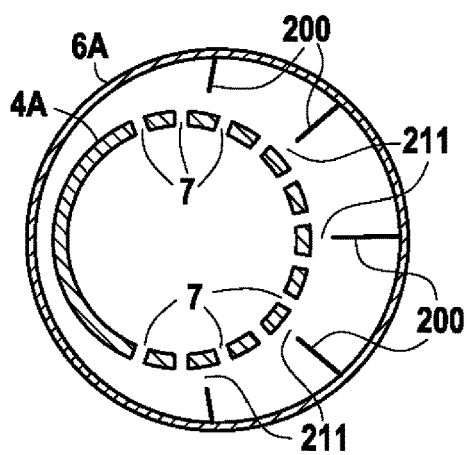

That is why, in order to limit the appearance of any uncovering, the present invention proposes providing at least one compartment wall 200 inner the tank parallel to the axis A' of the linear portion of the tank 6A when the tank has a plurality of communication orifices 7. The at least one compartment wall 200 subdivides the tank 6A into a plurality of sub-volumes, as shown in FIGS. 10A to 10C. In other words, the at least one compartment wall 200 subdivides the liquid and the gas contained in the tank 6A in such a manner that each sub-volume is connected to the feed pipe part 4A via one or more communication orifices 7.

In the description below, the term "compartment walls" 200 is used to designate at least one compartment wall 200.

Figure 9A:
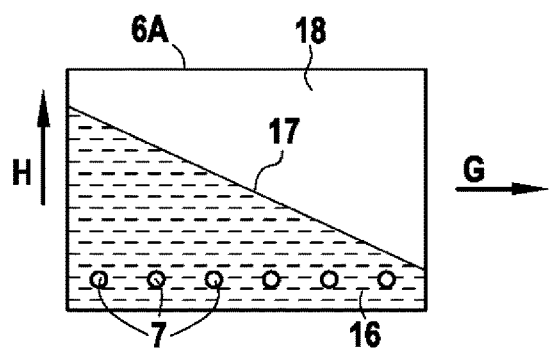
FIGS. 9A and 9B are theoretical diagrams for explaining the role of the compartment walls according to an embodiment of the invention.
Figure 9B:
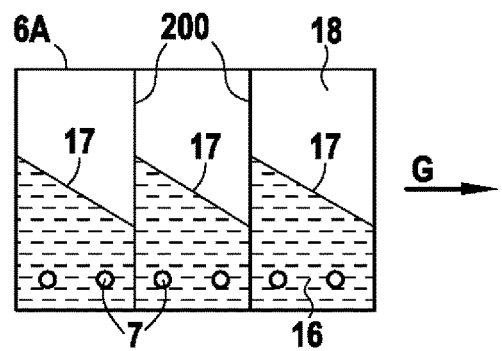

Thus, as shown in the theoretical diagram of FIG. 9B, when the sub-volumes compartmentalized by the walls 200 are of dimensions smaller than the inner dimensions of the tank considered as a whole, the risk of uncovering is limited.

FIGS. 10A and 10C show various possible configurations for the compartment walls 200.

In the configuration shown in FIG. 10A, the compartment walls 200 extend radially from the outside wall of the feed pipe part 4A to the inner wall of the tank 6A. It should be observed that the sub-volumes as limited in this way are in fluid flow communication with one another only if the compartment walls 200 do not occupy the entire height of the tank 6A. In the present context, the term "height" is used to designate the inner dimension of the tank 6A parallel to the axis A'.

In the configuration shown in FIG. 10B, the compartment walls 200 extend radially from the outside wall of the feed pipe part 4A towards the inner wall of the tank in such a manner that the distal ends of the walls face the inner wall 6A and a fluid communication space 210 is conserved between the distal ends and the inner wall.

In the configuration shown in FIG. 10C, the compartment walls 200 extend radially from the inner wall of the tank towards the outside wall of the feed pipe part 4A in such a manner that the distal ends of the walls face the outside wall of the feed pipe part 4A and a fluid communication space 211 is preserved between the distal ends and the outside wall.

Figure 11:
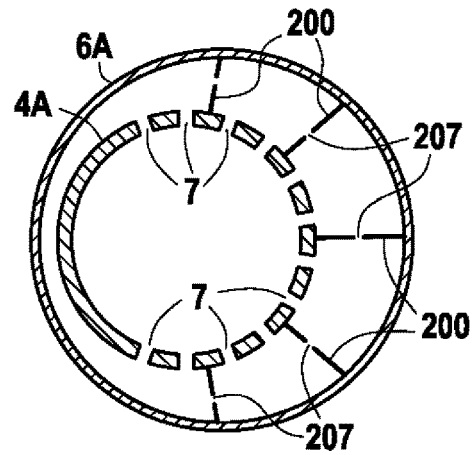
FIG. 11 is another section along B-B of FIG. 4A showing another possible configuration for the compartment walls.

In combination with all of the above-described configurations, provision may also be made for providing additional communication orifices 207 in the communication walls 200, as shown in FIG. 11.

The fluid communication spaces 210, 211, and/or the additional communication orifices 207 serve to put the sub-volumes defined by the at least one compartment wall 200 into fluid flow communication with one another.

It should be observed that it is possible to combine the above-mentioned configurations in various ways without going beyond the ambit of the present invention. For example, fluid communication spaces 210, 211 and additional communication orifices 207 may be provided in only some of the walls 200.

Furthermore, it should be observed that in the absence of additional communication orifices 207 or of fluid communication spaces 210, 211, it is necessary to ensure that the compartment walls 200 are of a height that is less than the mean height of the liquid in the tank 6A. In the present context, the term "mean height" designates the height of the liquid when the PCS is operating at its nominal operating point and is not being subjected to any lateral acceleration. Specifically, fluid flow communication between the sub-volumes defined by the communication walls 200 is necessary for conserving normal operation of the PCS in a lateral acceleration situation, even when it is provided with only one dip tube 9. Alternatively, provision may also be made for one or more additional dip tubes.

The compartment walls 200 may be made independently and the inserted in the PCS 5 made up of the three above-described parts 21, 22, and 23. When these parts are made by additive fabrication, the compartment walls 200 may be made at the same time during the same additive fabrication step. Furthermore, the compartment walls 200 extend from the outside wall of the feed pipe part 4A to the inner wall of the tank 6A (configuration of FIG. 10A), thereby increasing the strength of the system, such that it is possible for the bent part 21 to be provided with additional supports or securers 400 (shown in FIG. 5) for receiving outside loads on the bent part 21.

Finally, it should be observed that using compartment walls 200 is not limited to the PCS configurations of the present disclosure and is also compatible with prior art PCSs discussed at the beginning of the present disclosure, providing the same advantages.

Although the present invention has been described with reference to specific embodiments, it is obvious that modifications and changes may be undertaken on those embodiments without going beyond the general ambit of the invention as defined by the claims. Furthermore, individual characteristics of the various embodiments mentioned may be combined in additional embodiments. Consequently, the description and the drawings should be considered in a sense that is illustrative rather than restrictive.

The invention claimed is:

1. A pogo effect corrector system for a feed system for feeding a rocket engine with liquid propellant, comprising:
   a feed pipe part for feeding liquid propellant that is configured to be connected at the upstream and the downstream thereof to a liquid propellant feed pipe of the feed system; and
   a hydraulic accumulator comprising a tank connected to the feed pipe part via at least one communication orifice; wherein:
   at least a portion of the feed pipe part is at least partly surrounded by the inner volume of the tank, each cross-section of said portion relative to its central axis being at least partly surrounded by the corresponding cross-section of the inner volume of the tank, in such a manner that the corresponding cross-section of the inner volume of the tank is off-center relative to said cross-section of said portion.

2. A pogo effect corrector system according to claim 1, wherein the feed pipe part comprises a rectilinear portion extending to the downstream end of the feed pipe part.

3. A pogo effect corrector system according to claim 2, wherein the at least one communication orifice is formed in the rectilinear portion of the feed pipe part.

4. A pogo effect corrector system according to claim 2, wherein the tank includes a linear portion at least partly surrounding the rectilinear portion of the feed pipe part, and presenting a longitudinal axis passing via the center of each cross-section of the inner volume of the linear portion.

5. A pogo effect corrector system according to claim 4, wherein the longitudinal axis of the linear portion of the tank is parallel to the axis of the rectilinear portion of the feed pipe part.

6. A pogo effect corrector system according to claim 5, wherein the feed pipe part is bent in a bend direction, and the longitudinal axis of the linear portion of the tank is offset relative to the axis of the rectilinear portion of the feed pipe in a direction opposite to the bend direction.

7. A pogo effect corrector system according to claim 6, wherein the at least one communication orifice is formed in the half-perimeter of the feed pipe part situated on the side thereof opposite to the bend direction.

8. A pogo effect corrector system according to claim 6, including:
   a bent part defining a pipe volume and a tank volume that are disjoint;
   a base part secured to the bent part; and
   a communication part forming a sleeve comprising the at least one communication orifice in its wall, and being secured to the base part and to the bent part in such a manner as to be inserted in a volume defined by the base part and the bent part,
   the feed pipe part being defined by the walls of the pipe volume and, in its rectilinear portion by the communication part,
   the tank being defined by the walls of the tank volume, of the communication part, and of the base part.

9. A pogo effect corrector system according to claim 8, wherein the base part and the bent part are configured in such a manner as to be capable of being secured to each other by means of a circular flange.

10. A pogo effect corrector system according to claim 9, wherein a fluid flow communication space is provided between the distal end of the at least one compartment wall and the facing wall of the tank or of the feed pipe part in such a manner as to put the sub-volumes of the tank into fluid flow communication.

11. A pogo effect corrector system according to claim 8, wherein the base part, the bent part, and the communication part are made as a single unit by additive fabrication.

12. A pogo effect corrector system according to claim 4, wherein comprises at least one compartment wall parallel to the axis of the linear portion of the tank is arranged in the tank, in such a manner as to subdivide the tank into a plurality of sub-volumes, each sub-volume being connected to the feed pipe part via at least one communication orifice.

13. A pogo effect corrector system according to claim 12, wherein the at least one compartment wall extends radially from the wall of the feed pipe part.

14. A pogo effect corrector system according to claim 12, wherein the at least one compartment wall extends radially from the wall of the tank.

15. A pogo effect corrector system according to claim 12, wherein additional communication orifices are provided in the at least one compartment wall so as to put the sub-volumes of the tank into fluid flow communication.

* * * * *